United States Patent
Kanungo et al.

(10) Patent No.: US 9,187,587 B2
(45) Date of Patent: Nov. 17, 2015

(54) FLUOROELASTOMERS FOR MARKING SYSTEM COMPONENTS, INCLUDING GRAFTED FLUORINATED POLYMERS

(71) Applicant: XEROX CORPORATION, Norwalk, CT (US)

(72) Inventors: Mandakini Kanungo, Penfield, NY (US); Chakkaravarthy Chidambareswarapattar, Rolla, MO (US); David J. Gervasi, Pittsford, NY (US); Santokh S. Badesha, Pittsford, NY (US); Matthew M. Kelly, West Henrietta, NY (US); Akshat Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 200 days.

(21) Appl. No.: 13/931,983

(22) Filed: Jun. 30, 2013

(65) Prior Publication Data

US 2015/0002592 A1    Jan. 1, 2015

(51) Int. Cl.
*C09D 127/22* (2006.01)
*C08F 14/18* (2006.01)
*C08G 81/02* (2006.01)
*C09D 187/00* (2006.01)
*C08L 27/12* (2006.01)

(52) U.S. Cl.
CPC .............. *C08F 14/18* (2013.01); *C08G 81/021* (2013.01); *C08L 27/12* (2013.01); *C09D 187/005* (2013.01); *C08L 2205/03* (2013.01)

(58) Field of Classification Search
CPC ..................................................... C08G 81/021
See application file for complete search history.

(56) References Cited

U.S. PATENT DOCUMENTS

| | | | | |
|---|---|---|---|---|
| 4,530,969 | A | * | 7/1985 | Moggi et al. ................ 525/180 |
| 5,545,693 | A | * | 8/1996 | Hung et al. ................ 525/187 |
| 5,700,861 | A | * | 12/1997 | Tomihashi et al. .......... 524/344 |
| 2012/0103212 | A1 | | 5/2012 | Stowe et al. |
| 2013/0104756 | A1 | | 5/2013 | Stowe et al. |

* cited by examiner

*Primary Examiner* — Nicole M Buie-Hatcher
(74) *Attorney, Agent, or Firm* — Ronald E. Prass, Jr.; Prass LLP

(57) ABSTRACT

A marking system surface material includes a fluoroelastomer including grafted fluorinated polymers. The fluoroelastomer is a perfluoropolyether-grafted fluoroelastomer formed using an alkoxy-terminated fluorosilicone component, and exhibiting high contact angle and low sliding angle.

14 Claims, 6 Drawing Sheets

FLUOROELASTOMERS FOR MARKING SYSTEM COMPONENTS, INCLUDING GRAFTED FLUORINATED POLYMERS

FIELD OF DISCLOSURE

The disclosure relates to fluoropolymers for printing applications. In particular, the disclosure relates to fluoroelastomers comprising grafted fluorinated polymers suitable for forming marking system surfaces having high contact angle and low sliding angle.

BACKGROUND

Many composites of fluoroelastomers and fluoropolymers have been used in a variety of marking subsystem technology over the years. Fluoroelastomers are attractive for their excellent thermal and chemical properties, as well as their release properties when used with some toner and ink marking materials. There is a need for new fluorinated polymers that enable development and production of enhanced marking system materials.

SUMMARY

Fluoroelastomer compositions and methods for manufacturing such compositions using chemical grafting reactions applied to commercially available fluoroelastomer polymers are provided. The provided compositions and methods may be advantageously used in subsystem surfaces that contact marking material. For example, fluoroelastomer and perfluoropolyether-grafted polymer composites in accordance with embodiments may be used to form a contaminant-rejecting surface from which marking material may easily be removed. Surfaces in accordance with embodiments exhibit high contact angle, or angle at which a liquid interface meets a solid interface. The contact angle is a criterion of surface hydrophobicity, and may be used to determine wettability of a surface. Surfaces in accordance with embodiments also exhibit low sliding angle, or the critical angle at which a liquid begins to slide across the surface.

In an embodiment, a fluoropolymer composition of matter useful for marking system applications may include a fluoroelastomer component; and a perfluoropolyether component. The fluoroelastomer may be a terpolymer, the terpolymer being a peroxide curable terpolymer. The fluoroelastomer component may be grafted to the perfluoropolyether component with an amino-functionalized alkoxy-terminated fluorosilicone component.

In an embodiment, a marking system surface material may include a perfluoropolyether-grafted fluoroelastomer formed using an alkoxy-terminated fluorosilicone component. The material may include one or more functional fillers. The material may include a marking material system component surface configured for contacting marking material, the marking material being ink or toner, wherein the perfluoropolyether-grafted fluoroelastomer accommodates anti-contamination of the surface. The material may be flow-coated onto the surface.

In an embodiment, a method of forming a fluoroelastomer comprising grafted fluorinated polymers may include combining a first solution comprising a fluoroelastomer component and a second solution comprising an amino-functionalized fluorosilicone crosslinker component. The second solution may include a perfluoropolyether component. The first solution may be formed by preparing a surfactant mixture of FC-4430 and AKF-290 fluorosurfactants and combining the mixture with the fluoroelastomer component. In an embodiment, the first solution may be a 17.5% solution of fluoroelastomer in MIBK. In an embodiment, the second solution may be formed by mixing the crosslinker and the perfluoropolyether component in a 1.5 to 1 mol ratio, respectively.

In an embodiment, method may include the combining further comprising adding the second solution to the first solution dropwise. Methods may include combining the mixture of the first solution and the second solution with MgO, CaO, or a mixture thereof. Methods may include mixing the combined first and second solution and MgO, CaO, or mixture thereof. Methods may include the mixing being performed over 5 minutes at 23 degrees Celsius to form a mixed solution.

In an embodiment, methods may include pouring the solution. Methods may include outgassing the mixed solution at 23 degrees Celsius overnight; and curing the mixed solution at 218 degrees Celsius thereafter. In an embodiment, the solution may be poured onto a marking system surface.

In an embodiment, an ink-based digital printing system may include an imaging member having a reimageable surface layer, the surface layer comprising a fluoroelastomer component; and a perfluoropolyether component; a dampening fluid metering system, the dampening fluid metering system being configured to apply dampening fluid onto the reimageable surface; a dampening fluid patterning system, the dampening fluid patterning system being configured to form a pattern in the applied dampening fluid; and an inking system, the inking system being configured to apply ink to the imaging member surface, the surface having the patterned dampening fluid disposed thereon.

Exemplary embodiments are described herein. It is envisioned, however, that any system that incorporates features of systems described herein are encompassed by the scope and spirit of the exemplary embodiments.

DETAILED DESCRIPTION

Figure 1:
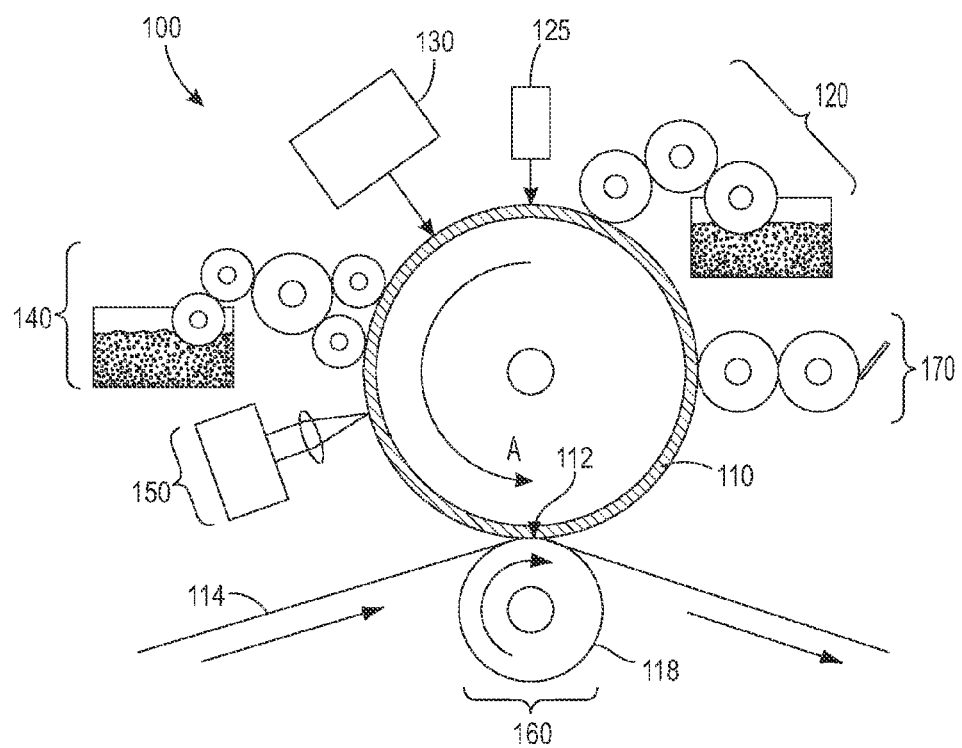
FIG. 1 shows a side diagrammatical view of a related art ink-based digital printing system.

Exemplary embodiments are intended to cover all alternatives, modifications, and equivalents as may be included within the spirit and scope of the apparatus and systems as described herein.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

Reference is made to the drawings to accommodate understanding of systems for ink-based digital printing using a system having an imaging member for which fluoroelastomers in accordance with embodiments are useful, and methods for manufacturing fluoroelastomer and perfluoropolyether-grafted polymer composites in accordance with embodiments. In the drawings, like reference numerals are used throughout to designate similar or identical elements.

Ink-based digital printing or variable data lithographic printing systems are discussed to provide an example of an advantageous use for fluoroelastomers and methods of manufacturing fluoroelastomers in accordance with embodiments. Fluoroelastomer compositions in accordance with embodiments and methods of manufacturing said compositions are useful for other applications, including printing applications other than ink-based digital printing.

"Variable data lithography printing," or "ink-based digital printing," or "digital offset printing" is lithographic printing of variable image data for producing images on a substrate that are changeable with each subsequent rendering of an image on the substrate in an image forming process. "Variable data lithographic printing" includes offset printing of ink images using lithographic ink wherein the images are based on digital image data that may vary from image to image. Ink-based digital printing uses a variable data lithography printing system, or digital offset printing system. A "variable data lithography system" is a system that is configured for lithographic printing using lithographic inks and based on digital image data, which may be variable from one image to the next.

Such systems are disclosed in U.S. patent application Ser. No. 13/095,714 ("714 Application"), titled "Variable Data Lithography System," filed on Apr. 27, 2011, by Stowe et al., the disclosure of which is hereby incorporated by reference herein in its entirety. The systems and methods disclosed in the 714 Application are directed to improvements on various aspects of previously-attempted variable data imaging lithographic marking concepts based on variable patterning of dampening fluids to achieve effective truly variable digital data lithographic printing.

The 714 Application describes an exemplary variable data lithography system 100 for ink-based digital printing, such as that shown, for example, in FIG. 1. A general description of the exemplary system 100 shown in FIG. 1 is provided here. Additional details regarding individual components and/or subsystems shown in the exemplary system 100 of FIG. 1 may be found in the 714 Application.

As shown in FIG. 1, the exemplary system 100 may include an imaging member 110. The imaging member 110 in the embodiment shown in FIG. 1 is a drum, but this exemplary depiction should not be interpreted so as to exclude embodiments wherein the imaging member 110 includes a drum, plate or a belt, or another now known or later developed configuration. The reimageable surface may be formed of materials including, for example, silicones, including polydimethylsiloxane (PDMS), among others. The reimageable surface may be formed of a relatively thin layer over a mounting layer, a thickness of the relatively thin layer being selected to balance printing or marking performance, durability and manufacturability.

The imaging member 110 is used to apply an ink image to an image receiving media substrate 114 at a transfer nip 112. The transfer nip 112 is formed by an impression roller 118, as part of an image transfer mechanism 160, exerting pressure in the direction of the imaging member 110. Image receiving medium substrate 114 should not be considered to be limited to any particular composition such as, for example, paper, plastic, or composite sheet film. The exemplary system 100 may be used for producing images on a wide variety of image receiving media substrates. The 714 Application also explains the wide latitude of marking (printing) materials that may be used, including marking materials with pigment densities greater than 10% by weight. As does the 714 Application, this disclosure will use the term ink to refer to a broad range of printing or marking materials to include those which are commonly understood to be inks, pigments, and other materials which may be applied by the exemplary system 100 to produce an output image on the image receiving media substrate 114.

The 714 Application depicts and describes details of the imaging member 110 including the imaging member 110 being comprised of a reimageable surface layer formed over a structural mounting layer that may be, for example, a cylindrical core, or one or more structural layers over a cylindrical core.

The system 100 includes a dampening fluid system 120 generally comprising a series of rollers, which may be considered as dampening rollers or a dampening unit, for uniformly wetting the reimageable surface of the imaging member 110 with dampening fluid. A purpose of the dampening fluid system 120 is to deliver a layer of dampening fluid, generally having a uniform and controlled thickness, to the reimageable surface of the imaging member 110. As indicated above, it is known that a dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Exemplary dampening fluids include water, Novec 7600 (1,1,1,2,3,3-Hexafluoro-4-(1,1,2,3,3,3-hexafluoropropoxy)pentane and has CAS #870778-34-0.), and D4 (octamethylcyclotetrasiloxane). Other suitable dampening fluids are disclosed, by way of example, in co-pending U.S. patent application Ser. No. 13/284,114, filed on Oct. 28, 2011, titled DAMPENING FLUID FOR DIGITAL LITHOGRAPHIC PRINTING, the disclosure of which is hereby incorporated herein by reference in its entirety.

Once the dampening fluid is metered onto the reimageable surface of the imaging member 110, a thickness of the dampening fluid may be measured using a sensor 125 that may provide feedback to control the metering of the dampening fluid onto the reimageable surface of the imaging member 110 by the dampening fluid system 120.

After a precise and uniform amount of dampening fluid is provided by the dampening fluid system 120 on the reimageable surface of the imaging member 110, and optical patterning subsystem 130 may be used to selectively form a latent image in the uniform dampening fluid layer by image-wise patterning the dampening fluid layer using, for example, laser energy. Typically, the dampening fluid will not absorb the optical energy (IR or visible) efficiently. The reimageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to the 714 Application's FIG. 5. Briefly, the application of optical patterning energy from the optical patterning subsystem 130 results in selective removal of portions of the layer of dampening fluid.

Following patterning of the dampening fluid layer by the optical patterning subsystem 130, the patterned layer over the reimageable surface of the imaging member 110 is presented to an inker subsystem 140. The inker subsystem 140 is used to apply a uniform layer of ink over the layer of dampening fluid and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface. The inker subsystem 140 may deposit the ink to the pockets representing the imaged portions of the reimageable surface, while ink on the unformatted portions of the dampening fluid will not adhere to those portions.

The cohesiveness and viscosity of the ink residing in the reimageable layer of the imaging member 110 may be modified by a number of mechanisms. One such mechanism may involve the use of a rheology (complex viscoelastic modulus) control subsystem 150. The rheology control system 150 may form a partial crosslinking core of the ink on the reimageable surface to, for example, increase ink cohesive strength relative to the reimageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the reimageable surface of the imaging member 110 to a substrate of image receiving medium 114 using a transfer subsystem 160. The transfer occurs as the substrate 114 is passed through a nip 112 between the imaging member 110 and an impression roller 118 such that the ink within the voids of the reimageable surface of the imaging member 110 is brought into physical contact with the substrate 114. With the adhesion of the ink having been modified by the rheology control system 150, modified adhesion of the ink causes the ink to adhere to the substrate 114 and to separate from the reimageable surface of the imaging member 110. Careful control of the temperature and pressure conditions at the transfer nip 112 may allow transfer efficiencies for the ink from the reimageable surface of the imaging member 110 to the substrate 114 to exceed 95%. While it is possible that some dampening fluid may also wet substrate 114, the volume of such a dampening fluid will be minimal, and will rapidly evaporate or be absorbed by the substrate 114.

In certain offset lithographic systems, it should be recognized that an offset roller, not shown in FIG. 1, may first receive the ink image pattern and then transfer the ink image pattern to a substrate according to a known indirect transfer method.

Following the transfer of the majority of the ink to the substrate 114, any residual ink and/or residual dampening fluid must be removed from the reimageable surface of the imaging member 110, preferably without scraping or wearing that surface. An air knife may be employed to remove residual dampening fluid. It is anticipated, however, that some amount of ink residue may remain. Removal of such remaining ink residue may be accomplished through use of some form of cleaning subsystem 170. The 714 Application describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the dampening fluid of the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 Application details other mechanisms by which cleaning of the reimageable surface of the imaging member 110 may be facilitated. Regardless of the cleaning mechanism, however, cleaning of the residual ink and dampening fluid from the reimageable surface of the imaging member 110 is essential to preventing ghosting in the proposed system. Once cleaned, the reimageable surface of the imaging member 110 is again presented to the dampening fluid system 120 by which a fresh layer of dampening fluid is supplied to the reimageable surface of the imaging member 110, and the process is repeated.

The imaging member reimageable surface may comprise a polymeric elastomer, such as silicone rubber and/or fluorosilicone rubber. The term "silicone" is well understood in the art and refers to polyorganosiloxanes having a backbone formed from silicon and oxygen atoms and sidechains containing carbon and hydrogen atoms. For the purposes of this application, the term "silicone" should also be understood to exclude siloxanes that contain fluorine atoms, while the term "fluorosilicone" is used to cover the class of siloxanes that contain fluorine atoms. Other atoms may be present in the silicone rubber, for example nitrogen atoms in amine groups which are used to link siloxane chains together during crosslinking. The side chains of the polyorganosiloxane can also be alkyl or aryl.

The term "alkyl" as used herein refers to a group composed entirely of carbon atoms and hydrogen atoms that is fully saturated. The alkyl group may include a chain that is linear, branched, or cyclic. For example, linear alkyl radicals generally have the formula —$C_nH_{2n+1}$.

The term "aryl" refers to an aromatic group composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms).

The term "alkoxy" refers to an alkyl group singular bonded to an oxygen atom.

The term "amino" refers to a group containing a nitrogen atom attached by single bonds to hydrogen atoms, alkyl groups, aryl groups, or a combination thereof. An "amine" is an organic compound that contains an amino group. Amines are derivates of the inorganic compound ammonia.

The imaging member surface for use in an ink-based digital printing system may comprise compounds other than, or in addition to, silicone and/or fluorosilicone. In particular, the imaging member surface may advantageously comprise grafted fluoroelastomers provided herein in accordance with embodiments for enhanced performance. For example, the imaging member may comprise a fluoroelastomer-perfluoropolyether-grafted polymer in accordance with compositions of embodiments that is manufactured using methods in accordance with embodiments.

A "fluoroelastomer" is a fluorocarbon-derivative, a synthetic rubber. The term fluoroelastomer is well understood in the art. A fluoroelastomer or fluoro rubber of the polymethylene type uses vinylidene fluoride as a comonomer and has substituent fluoro, alkyl, perfluoroalkyl, or perfuoroalkoxy groups on the polymer chain. Fluoroelastomers are categorized under the ASTM D1418, and have the ISO 1629 designation FKM. This class of elastomer is a family comprising copolymers of hexafluoropropylene (HFP) and vinyldiene fluoride (VDF or VF2), terpolymers of tetrafluoroethylene (TFE), vinyldiene fluoride (VDF) and hexafluoropropylene (HFP) and perfluoromethylvinylether (PMVE) containing components. Exemplary fluoroelastomers are commercially available from DuPont Performance Elastomers L.L.C. under the VITON brand, and from Solay under the TECNOFLON brand as P959.

A "perfluoropolyether" is a lubricant that is a non-reactive, non-volatile, and non-flammable fluorinated hydrocarbon derivative containing ether functionality. This class of polymer includes shielded and non-shielded perfluoropolyether structures. The term perfluoropolyether is well understood in the art. Perfluoropolyether (PFPE) is known to exhibit superior load and wear characteristics, relative to, for example, fluorosilicone. Exemplary PFPE compounds (FLS 10) suitable for use in compositions and methods of embodiments is available from DuPont under the KRYTOX brand, and also from Solay under the FLUOROLINK brand, for example.

Compositions in accordance with embodiments comprise a grafted polymer comprising FKM and PFPE components. The fluoroelastomer-perfluoropolyether-grafted polymer is formed using an amino-functionalized alkoxy-terminated fluorosilicone as a cross-linking reagent. It has been found that fluoroelastomer-perfluoropolyether-grafted polymers in accordance with embodiments of compositions and methods are superior to those formed using AO800 as a cross-linking reagent. In an embodiment, compositions may include a functional filler. Functional filler may comprise one or more functional fillers with a diverse range of various morphology, shape, density, hardness, thermal properties, electrical properties, and optical properties, which could enhance any specifically desired properties required of the material. These functional fillers could consist of, but are not limited to, carbon black, graphene, graphite, carbon nanotubes, iron oxide, copper flakes, copper particles, copper needles, aluminum oxide, nano-alumina, titanium oxide, silver flakes, aluminum nitride, nickel particles, silicon carbide, silicon nitride, clays, calcium carbonate, talcs (magnesium silicate, calcium silicate), etc.

In particular, it has been found that incompatibilities between a perfluoropolyether such as FLS10 and the AO800 crosslinker may inhibit the grafting of FKM with FLS10. It has been found that using an amino-functionalized alkoxy-terminated fluorosilicone as the crosslinking agent provides a grafted polymer that exhibits a surface characterization simultaneously showing an advantageously high contact angle of 67.8, and a low sliding angle of 15-18. As such, fluoroelastomer-perfluoropolyether-grafted polymer composites of embodiments and methods of manufacture thereof may provide enhanced marking component surface material suitable for marking applications such as for forming an imaging member surface in an ink-based digital printing system as discussed above with reference to the 714 Application.

Figure 2A:
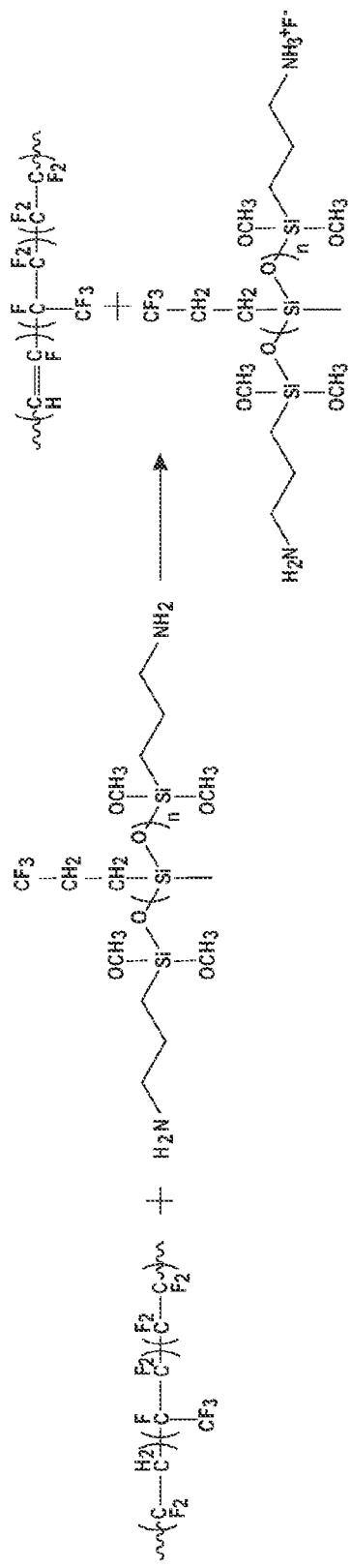
FIG. 2A shows a synthesis mechanism for forming a fluoroelastomer in accordance with an embodiment (dehydrofluorination)

Fluoroelastomer-perfluoropolyether-grafted polymer composites in accordance with embodiments may be formed by way of the reaction mechanism shown in FIGS. 2A through 2D. In particular, FIG. 2A shows a first step of dehydrofluorination in which a fluoroelastomer, for example, TECNOFLON P959, is caused to react with an amino-functionalized alkoxy-terminated fluorosilicone (EF), resulting in a carbon-carbon double bond in P959 upon loss of a fluoride ion.

Figure 2B:
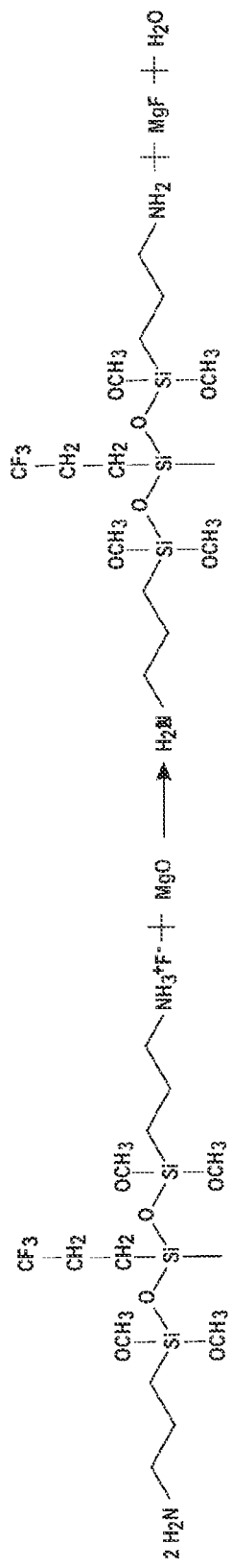
FIG. 2B shows a synthesis mechanism for forming a fluoroelastomer in accordance with an embodiment (regeneration of amine)
Figure 2C:
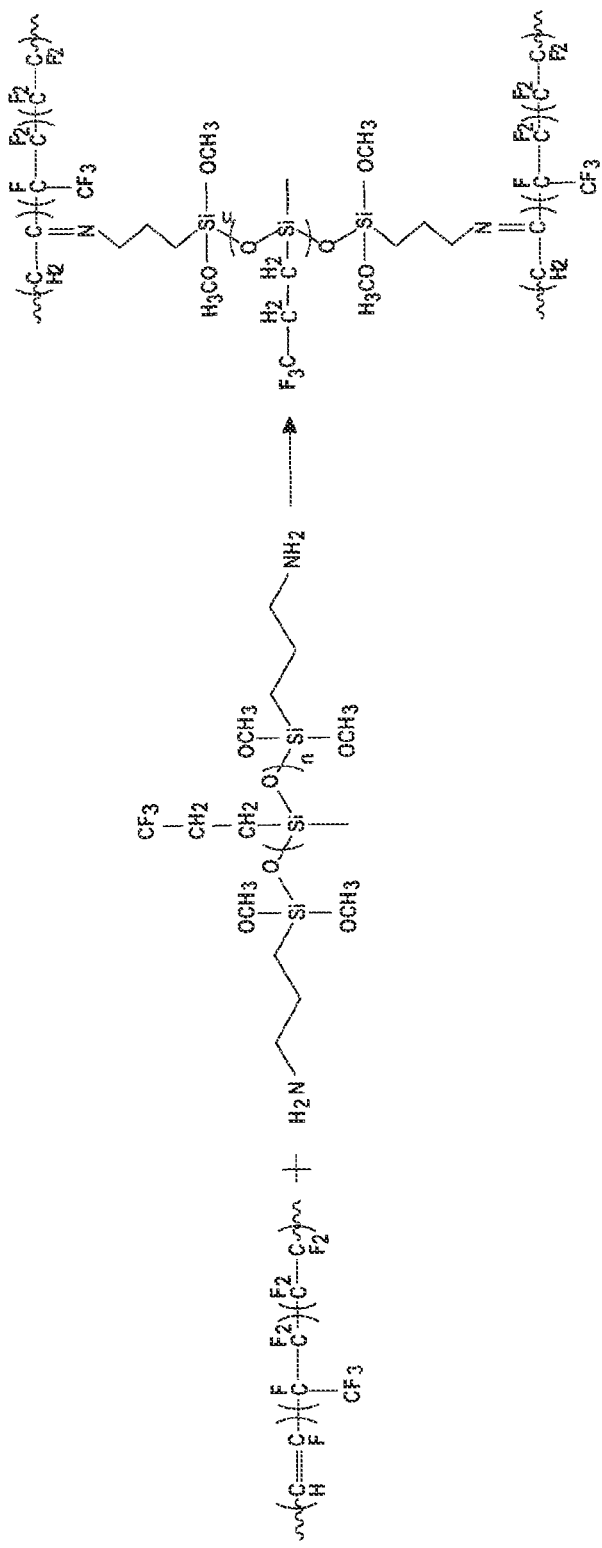
FIG. 2C shows a synthesis mechanism for forming a fluoroelastomer in accordance with an embodiment (addition of amine across the double bond)
Figure 2D:
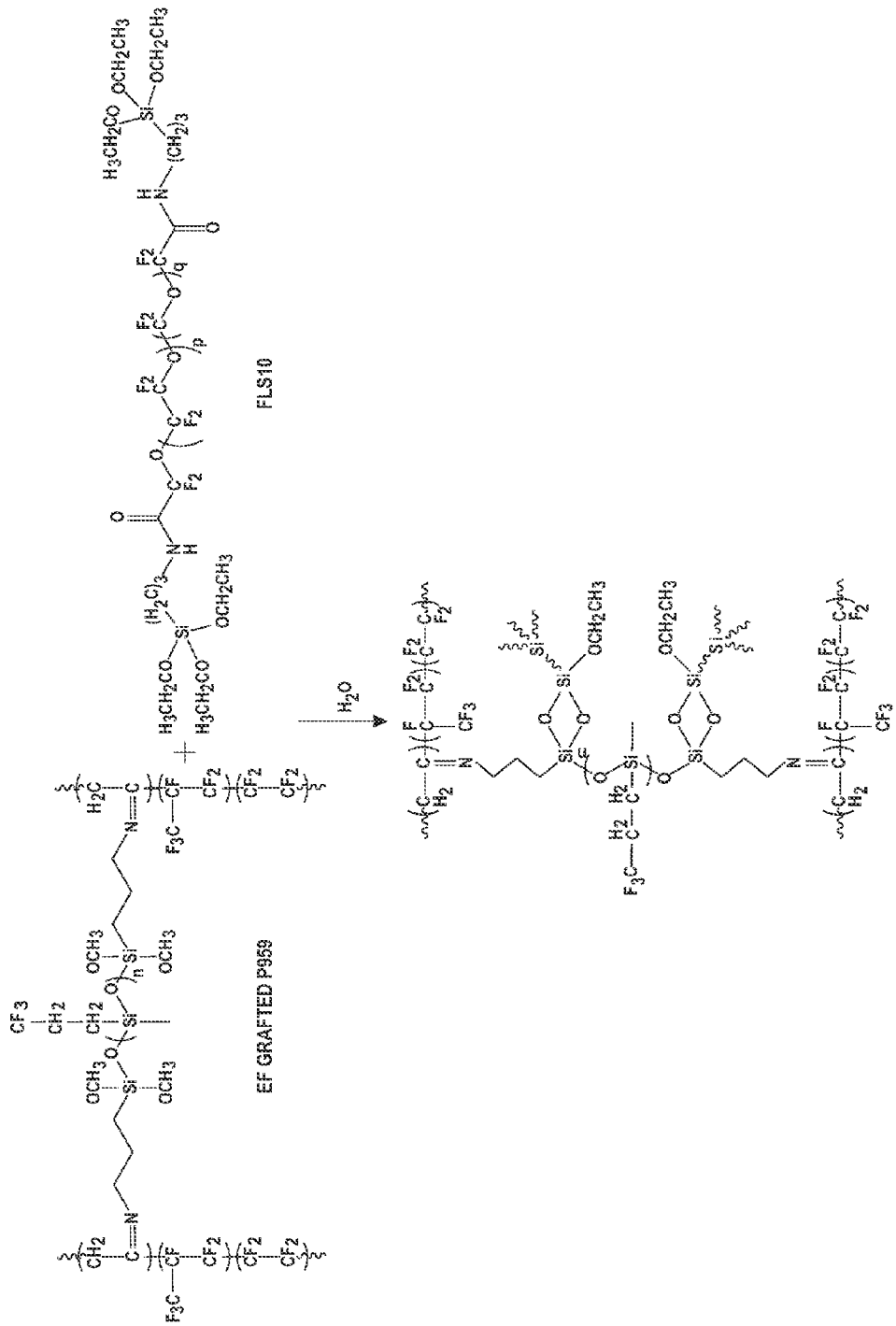
FIG. 2D shows a synthesis mechanism for forming a fluoroelastomer in accordance with an embodiment (hydrolysis and condensation)

Step 2 shown in FIG. 2B includes a step of regenerating the amine wherein the terminal amino group is regenerated in the presence of magnesium oxide to form a regenerated crosslinker. Then, in a third step shown in FIG. 2C the dehydrofluorinated P959 formed by step 1 is caused to react with the regenerated crosslinker at step 3. In particular, an amine is added across the modified P959 double bond by the addition of an amino-functional alkoxy-terminated fluorosilicone to yield an amino-functionalized alkoxy-terminated fluorosilicone (EF) grafted P959 composition. Finally, FIG. 2D shows a fourth step of hydrolysis and condensation. In particular, FIG. 3 shows reacting, at Step 4, perfluoropolyether, FLS10, with the EF grafted P959 in a crosslinking reaction using EF as the crosslinker.

Figure 3:
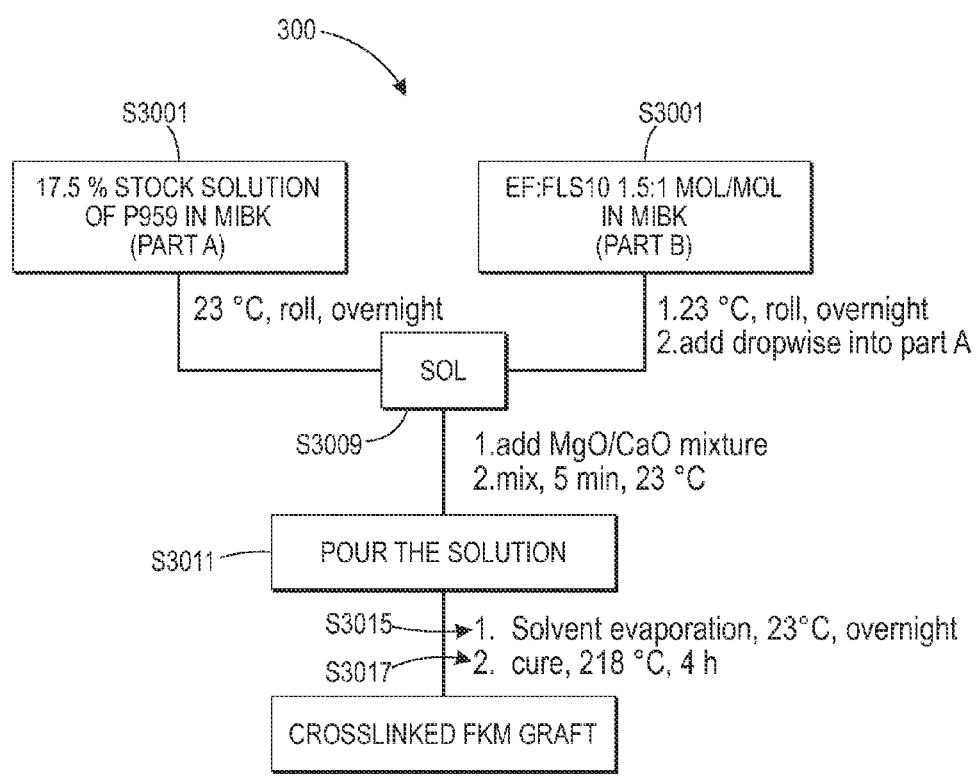
FIG. 3 shows a process for forming a fluoroelastomer in accordance with an embodiment.

FIG. 3 shows a process 300 for forming fluoroelastomer-perfluoropolyether-grafted polymer from P959, in accordance with the synthesis mechanism shown in FIGS. 2A-2D. In particular, FIG. 3 shows a process 300 for manufacturing grafted fluoroelastomer including adding at S3001 a 17.5% solution of P959 in methyl isobutyl ketone (MIBK) (Part A) with a 1.5:1 mol/mol of EF:FLS10 in MIBK (Part B). Part A may consist of a very low amount of surfactant that provides good compatibility between P959 and the release layer/oil applied on, for example, a fuser, while preventing pin holes/fish eye-type image quality defects. For example, the surfactant may comprise a surfactant mixture of FC-4430 and AKF-290 fluorosurfactants. Part B is added dropwise into Part A to form a solution comprising Part A and Part B.

FIG. 3 shows that at S3009 magnesium oxide or calcium oxide is added to the solution of Part A and Part B and mechanically shaken vigorously for 5 minutes at 23 degrees Celsius, then allowed to roll in order to reduce any air bubble formation. The mixture is poured at S3011, and outgases (solvent evaporation) at 23 degrees Celsius overnight at S3015. At S3017, the solidified material film is cured for 4 hours at 218 degrees Celsius. The resulting composition is a crosslinked FKM graft.

By way of example, a solution in accordance with Part A and a solution in accordance with Part B were prepared, rolled overnight at 23 degrees Celsius for about 16 to 18 hours. Part B was added into Part A dropwise. Once the addition of Part B to Part A was done, a mixture of magnesium oxide and calcium oxide was added into the Part A/Part B mixture and mechanically shaken vigorously for 5 minutes.

The resulting solution was poured into molds that were 6×6 inches, and kept at room temperature for 16 to 18 hours. Part of the solution was draw bar coated on polyimide substrate for surface property measurements, allowed to outgas (solvent evaporation) at room temperature overnight, and transferred to an oven that was kept at 218 degrees Celsius for 4 hours.

The resulting grafted fluoropolymers were compared with related art compositions. In particular, the mechanical properties of P959-FLS10-EF were evaluated for comparison. The results are shown in Table 1.

TABLE 1

| Film ID | Stress at Break (psi) | Strain at Break (%) | Toughness (in.-lbs./in.$^3$) | Initial Modulus (psi) |
|---|---|---|---|---|
| P959-MgO/CaO | 1445 (1404-1497) | 404 (394-418) | 2410 (2272-2593) | 794 (735-893) |
| P959-EF-FLS10-MgO/CaO | 896 (822-947) | 277 (261-295) | 1105 (958-1233) | 457 (451-469) |
| production fuser roll material | 1093.5 | 165 | 764.5 | 1597.5 |

Table 1 shows that the mechanical properties are decreased for compositions in accordance with embodiments, with respect to P959 alone, but still within range of some exemplary fuser materials. A common surrogate method for pre-evaluation of surface contamination and release is contact angle and sliding angle evaluation using hexadecane. Table 2 shows a contact angle and sliding angle of P959 along, P959-fluorolink graft using AO800 as a crosslinker and P959-fluorolink graft using EF as a crosslinker. The contact angle for hexadecane is higher for the P959-fluorolink grafts compared to P959 alone, indicating the oleophobic nature of the fluorolink graft composite. Moreover, the sliding angle study of hexadecane shows that hexadecane slides off a P959-fluorolink surface whereas it sticks to the P959 surface. Still, the sliding angle was high in the P959-fluorolink graft using AO800 as a crosslinker. On the other hand, with the EF as a crosslinker, the contact angle is high and the sliding angle is low, e.g., less than 20. This is considerable improvement over related art grafts. High contact angle and improved sliding angle of the graft indicates "non-stickiness/anti-contamination properties" of the surface with the new crosslinker.

TABLE 2

| Material | Contact angle (hexadecane) | Sliding angle (hexadecane) |
|---|---|---|
| P959 (with AO800) | 41.2 (3) | Does not slide |
| FKM-fluorolink (with AO800) | 68.1 (2) | 30-35 |
| FKM-fluorolink (with EF) | 67.8 (2) | 15-18 |

It will be appreciated that the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A fluoropolymer composition, comprising:
a fluoroelastomer component; and
a perfluoropolyether component, the fluoroelastomer component being grafted to the perfluoropolyether component with an amino-functionalized alkoxy-terminated fluorosilicone component.

2. The composition of claim 1, wherein in the fluoroelastomer is a terpolymer, the terpolymer being a peroxide curable terpolymer.

3. A method of forming a fluoroelastomer comprising grafted fluorinated polymers, the method comprising:
combining a first solution comprising a fluoroelastomer component and a second solution comprising an amino-functionalized fluorosilicone crosslinker component including a perfluoropolyether component, the fluoroelastomer component being grafted to the perfluoropolyether component with an amino-functionalized alkoxy-terminated fluorosilicone component.

4. The method of claim 3, the first solution being formed by preparing a surfactant mixture of fluorosurfactants and combining the mixture with the fluoroelastomer component.

5. The method of claim 4, the first solution being a 17.5% solution of fluoroelastomer in MIBK.

6. The method of claim 3, the second solution being formed by mixing the crosslinker and the perfluoropolyether component in a 1.5 to 1 mol ratio, respectively.

7. The method of claim 3, the combining further comprising adding the second solution to the first solution dropwise.

8. The method of claim 3, comprising:
combining the mixture of the first solution and the second solution with MgO, CaO, or a mixture thereof.

9. The method of claim 8, comprising mixing the combined first and second solution and MgO, CaO, or mixture thereof.

10. The method of claim 9, the mixing being performed over 5 minutes at 23 degrees Celsius to form a mixed solution.

11. The method of claim 10, comprising:
pouring the solution.

12. The method of claim 11, wherein the solution is poured onto a marking system surface.

13. The method of claim 10, comprising:
outgassing the mixed solution at 23 degrees Celsius overnight; and curing the mixed solution at 218 degrees Celsius thereafter.

14. An ink-based digital printing system, comprising:
an imaging member having a reimageable surface layer, the surface layer comprising a fluoroelastomer component and a perfluoropolyether component, the fluoroelastomer component being grafted to the perfluoropolyether component with an amino-funetionalized alkoxy-terminated fluorosilicone component;
a dampening fluid metering system, the dampening fluid metering system being configured to apply dampening fluid onto the reimageable surface;
a dampening fluid patterning system, the dampening fluid patterning system being configured to form a pattern in the applied dampening fluid; and
an inking system, the inking system being configured to apply ink to the imaging member surface, the surface having the patterned dampening fluid disposed thereon.

* * * * *